United States Patent
Washio

(10) Patent No.: US 12,371,029 B2
(45) Date of Patent: Jul. 29, 2025

(54) INFORMATION PROCESSING DEVICE, INFORMATION PROCESSING SYSTEM, AND INFORMATION PROCESSING METHOD

(71) Applicant: TOYOTA JIDOSHA KABUSHIKI KAISHA, Aichi-ken (JP)

(72) Inventor: Kota Washio, Shizuoka-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 181 days.

(21) Appl. No.: 18/186,201

(22) Filed: Mar. 20, 2023

(65) Prior Publication Data
US 2023/0356720 A1 Nov. 9, 2023

(30) Foreign Application Priority Data
May 9, 2022 (JP) .................................. 2022-077135

(51) Int. Cl.
| | |
|---|---|
| *B60W 40/08* | (2012.01) |
| *B60W 40/105* | (2012.01) |
| *G06V 20/59* | (2022.01) |
| *G06V 40/16* | (2022.01) |
| *G06V 40/18* | (2022.01) |

(52) U.S. Cl.
CPC .......... *B60W 40/08* (2013.01); *B60W 40/105* (2013.01); *G06V 20/597* (2022.01); *G06V 40/161* (2022.01); *G06V 40/18* (2022.01); *B60W 2040/0827* (2013.01); *B60W 2420/403* (2013.01); *B60W 2540/225* (2020.02); *B60W 2540/229* (2020.02)

(58) Field of Classification Search
CPC .............. B60W 40/08; B60W 40/105; B60W 2540/225; B60W 2540/229; B60W 2040/0827; B60W 2420/403; G06V 20/597; G06V 40/161; G06V 40/18; G06V 40/197; G06V 40/172; H04N 23/50

See application file for complete search history.

(56) References Cited

U.S. PATENT DOCUMENTS

| | | | | |
|---|---|---|---|---|
| 2019/0370580 A1* | 12/2019 | Aoi | ...................... | G06V 40/193 |
| 2021/0053565 A1* | 2/2021 | Kim | .................... | B60W 30/182 |
| 2021/0350155 A1 | 11/2021 | Takinami et al. | | |
| 2021/0394775 A1* | 12/2021 | Julian | .................... | G06V 20/58 |
| 2022/0234607 A1* | 7/2022 | Hata | .................. | B60W 60/001 |
| 2023/0150527 A1* | 5/2023 | Son | ..................... | B60W 40/105 |
| | | | | 340/576 |
| 2023/0227058 A1* | 7/2023 | Julian | .................... | G08G 1/164 |
| | | | | 340/439 |

FOREIGN PATENT DOCUMENTS

| | | |
|---|---|---|
| JP | 2000-123188 A | 4/2000 |
| JP | 2009-289136 A | 12/2009 |
| JP | 2013-105263 A | 5/2013 |
| JP | 2018-132974 A | 8/2018 |
| JP | 2020-47086 A | 3/2020 |

* cited by examiner

*Primary Examiner* — Sisay Yacob
(74) *Attorney, Agent, or Firm* — HAUPTMAN HAM, LLP

(57) ABSTRACT

An acquisition unit acquires vehicle information and a moving image frame as image information captured by an imaging unit from a database. A recognition unit recognizes opening and closing of an eye of a driver, a direction of a face, and a gaze point. An extraction unit extracts, from among the captured images acquired by the acquisition unit, a captured image in which the eye is closed and the face is facing forward in a predetermined range.

13 Claims, 5 Drawing Sheets

○ : DEGREE OF EYE OPENING = OPENING OF EYES [mm]
▬ : OPEN-CLOSED EYES = 1: OPEN EYES, 2: CLOSED EYES
▬ : UPPER AND LOWER POSITIONS OF GAZE POINT

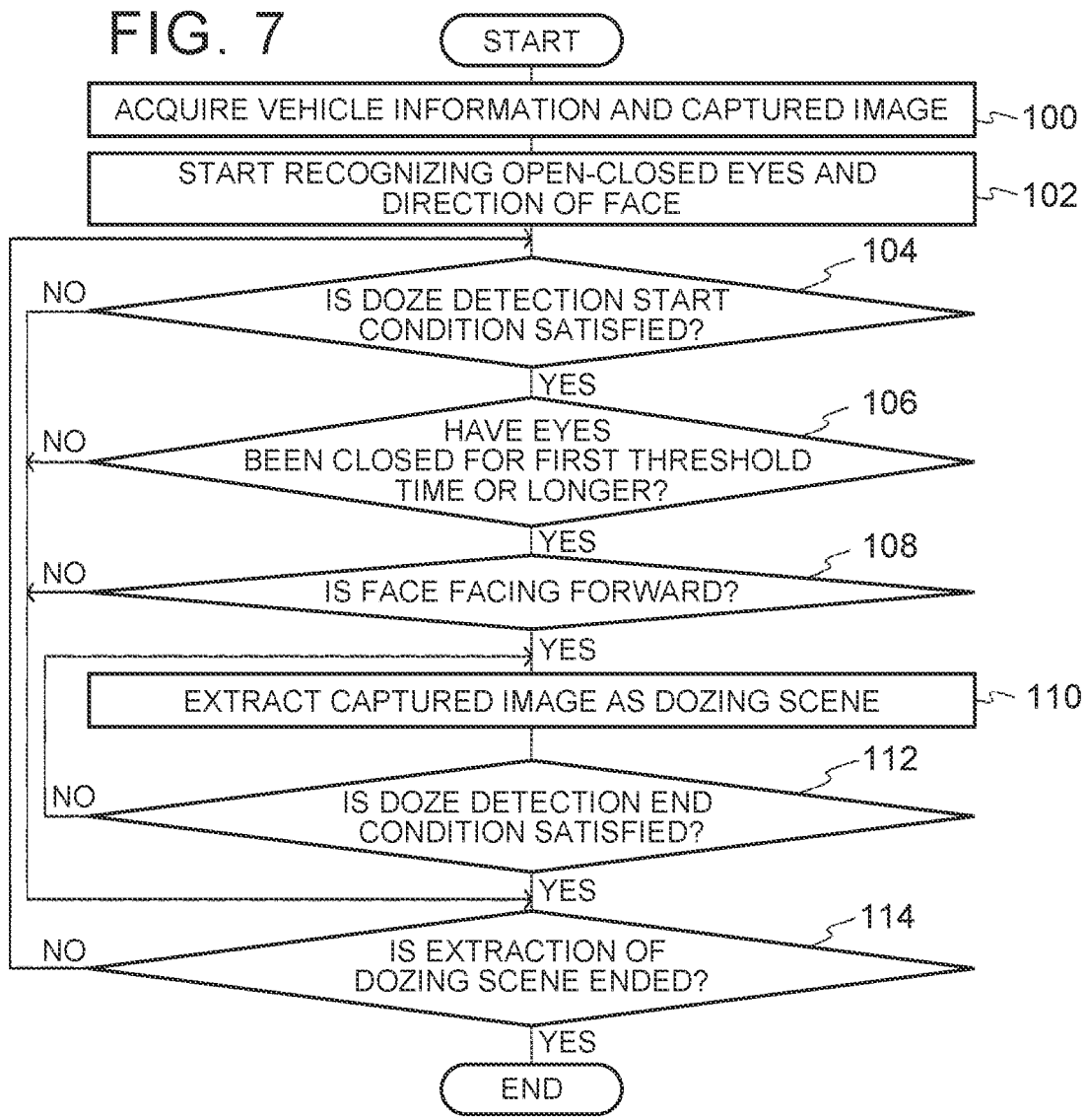
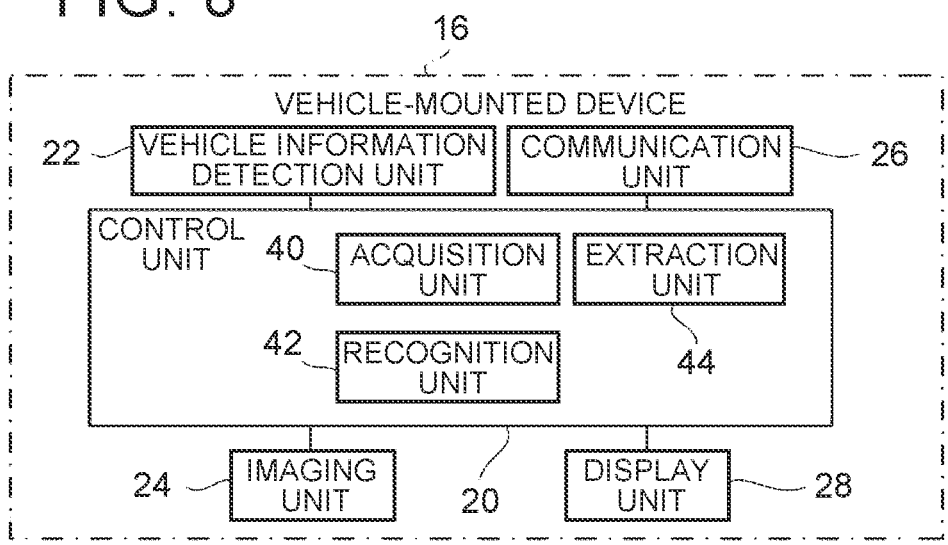

INFORMATION PROCESSING DEVICE, INFORMATION PROCESSING SYSTEM, AND INFORMATION PROCESSING METHOD

CROSS-REFERENCE TO RELATED APPLICATION

This application claims priority to Japanese Patent Application No. 2022-077135 filed on May 9, 2022, incorporated herein by reference in its entirety.

BACKGROUND

1. Technical Field

The present disclosure relates to an information processing device, an information processing system, and an information processing method.

2. Description of Related Art

Japanese Unexamined Patent Application Publication No. 2020-047086 (JP 2020-047086 A) proposes a vehicle monitoring device that includes an imaging unit that captures an image of a driver of a vehicle, a driving state measuring unit that analyzes the image captured by the imaging unit and measures a plurality of driving states including a degree of eye opening of the driver, a travel state determination unit that determines a travel state of the vehicle, and a warning determination unit that determines whether a warning device is operated based on the driving state and the travel state, and that causes the driving state measuring unit to re-execute a detection process of the degree of eye opening when it is determined that the driving state other than the degree of eye opening is normal and the travel state is also normal in a case where statistics calculated from chronological data of the degree of eye opening obtained by the warning determination unit from the driving state measuring unit deviate from a predetermined normal determination reference range.

SUMMARY

There is room for improvement since it is erroneously determined that the eyes of a driver are closed depending on the direction of the face when a dozing scene is extracted based on the degree of eye opening, in a case where dozing of the driver is detected from a captured image of the driver and an image of the dozing scene is extracted.

The present disclosure has been made in consideration of the above facts, and an object of the present disclosure is to provide an information processing device, an information processing system, an information processing method, and an information processing program capable of reliably extracting the captured image in which the eyes are closed as compared with a case where the captured image in which the eyes are closed is extracted based on the degree of eye opening.

An information processing device according to a first aspect includes: an acquisition unit that acquires a captured image of a moving image of a face of an occupant; and an extraction unit that extracts, from among the captured images acquired by the acquisition unit, a captured image in which an eye is closed and the face is facing forward in a predetermined range.

According to the first aspect, not only the captured image in which the eyes are closed but also the captured image in which the face is facing forward are extracted, so that it is possible to reliably extract the captured image in which the eyes are closed as compared with a case where the captured image in which the eyes are closed is extracted based on the degree of eye opening.

The information processing device according to a second aspect, in the information processing device according to the first aspect, further includes a recognition unit that recognizes a direction of the face of the occupant and an open-closed state of the eye of the occupant by image recognition in the captured images acquired by the acquisition unit.

According to the second aspect, the direction of the face of the occupant and the open-closed state of the eyes of the occupant are recognized by image recognition, so that it is possible to recognize the direction of the face of the occupant and the open-closed state of the eyes.

In the information processing device according to a third aspect, in the information processing device according to the first aspect or the second aspect, the acquisition unit further acquires vehicle speed information; and the extraction unit extracts a captured image when a vehicle speed is equal to or higher than a predetermined threshold value.

According to the third aspect, the captured image when the vehicle speed is equal to or higher than the predetermined threshold value is extracted, so that it is possible to exclude extraction of a captured image in which the eyes are closed during parking such as rest.

In the information processing device according to a fourth aspect, in the information processing device according to the third aspect, the extraction unit terminates extraction of the captured image when the vehicle speed is less than the threshold value or duration of a closed-eye state is less than a predetermined time.

According to the fourth aspect, when the vehicle speed is less than the threshold value or the duration of the closed eye state is less than the predetermined time, the extraction of the captured image is terminated, so that it is possible to extract only the captured image in which the eyes are closed during traveling.

In the information processing device according to a fifth aspect, in the information processing device according to the second aspect, the recognition unit further recognizes a gaze point of the occupant by the image recognition; and the extraction unit invalidates a recognition result of the open-closed state with respect to a captured image of the gaze point outside the predetermined range set by the recognition unit.

According to the fifth aspect, the recognition result of the open-closed state of the eyes of the occupant with respect to the captured image of the gaze point outside the predetermined range is invalidated, so that it is possible to suppress erroneous determination when the captured image in which the eyes are closed is extracted.

In the information processing device according to a sixth aspect, in the information processing device according to any one of the first to the fifth aspects, the extraction unit preferentially extracts a captured image in which the occupant is facing forward in a right-left direction over a captured image in which the occupant is facing forward in an up-down direction.

According to the sixth aspect, the captured image in which the driver is facing forward in the right-left direction is preferentially extracted over the captured image in which the driver is facing forward in the up-down direction, so that it is possible to suppress erroneous determination when the captured image in which the eyes are closed is extracted rather than giving priority to the captured image in which the driver is facing forward in the up-down direction.

An information processing system according to a seventh aspect includes: a vehicle including an imaging unit that captures an image of a face of an occupant and that generates a captured image of a moving image; and an information processing device including an acquisition unit that acquires the captured image from the vehicle, and an extraction unit that extracts a captured image in which an eye of the occupant is closed and the face is facing forward in a predetermined range from among the captured images acquired by the acquisition unit.

According to the seventh aspect, not only the captured image in which the eyes are closed but also the captured image in which the face is facing forward are extracted, so that it is possible to provide the information processing system capable of reliably extracting the captured image in which the eyes are closed as compared with a case where the captured image in which the eyes are closed is extracted based on the degree of eye opening.

An information processing method according to an eighth aspect is a method in which a computer executes processes including: acquiring a captured image of a moving image of a face of an occupant; and extracting, from among the captured images that have been acquired, a captured image in which an eye is closed and the face is facing forward in a predetermined range.

According to the eighth aspect, not only the captured image in which the eyes are closed but also the captured image in which the face is facing forward are extracted, so that it is possible to provide the information processing method capable of reliably extracting the captured image in which the eyes are closed as compared with a case where the captured image in which the eyes are closed is extracted based on the degree of eye opening.

An information processing program according to a ninth aspect causes a computer to execute processes including: acquiring a captured image of a moving image of a face of an occupant; and extracting, from among the captured images that have been acquired, a captured image in which an eye is closed and the face is facing forward in a predetermined range.

According to the ninth aspect, not only the captured image in which the eyes are closed but also the captured image in which the face is facing forward are extracted, so that it is possible to provide the information processing program capable of reliably extracting the captured image in which the eyes are closed as compared with a case where the captured image in which the eyes are closed is extracted based on the degree of eye opening.

As described above, according to the present disclosure, it is possible to provide the information processing device, the information processing system, the information processing method, and the information processing program capable of reliably extracting the captured image in which the eyes are closed as compared with a case where the captured image in which the eyes are closed is extracted based on the degree of eye opening.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 7 is a flowchart showing an example of a flow of a process performed by a server in the information processing system according to the present embodiment; and FIG. 8 is a functional block diagram showing a functional configuration of the vehicle-mounted device when functions of the central processing unit are provided in the control unit on the vehicle-mounted device side.

DETAILED DESCRIPTION OF EMBODIMENTS

Figure 1:
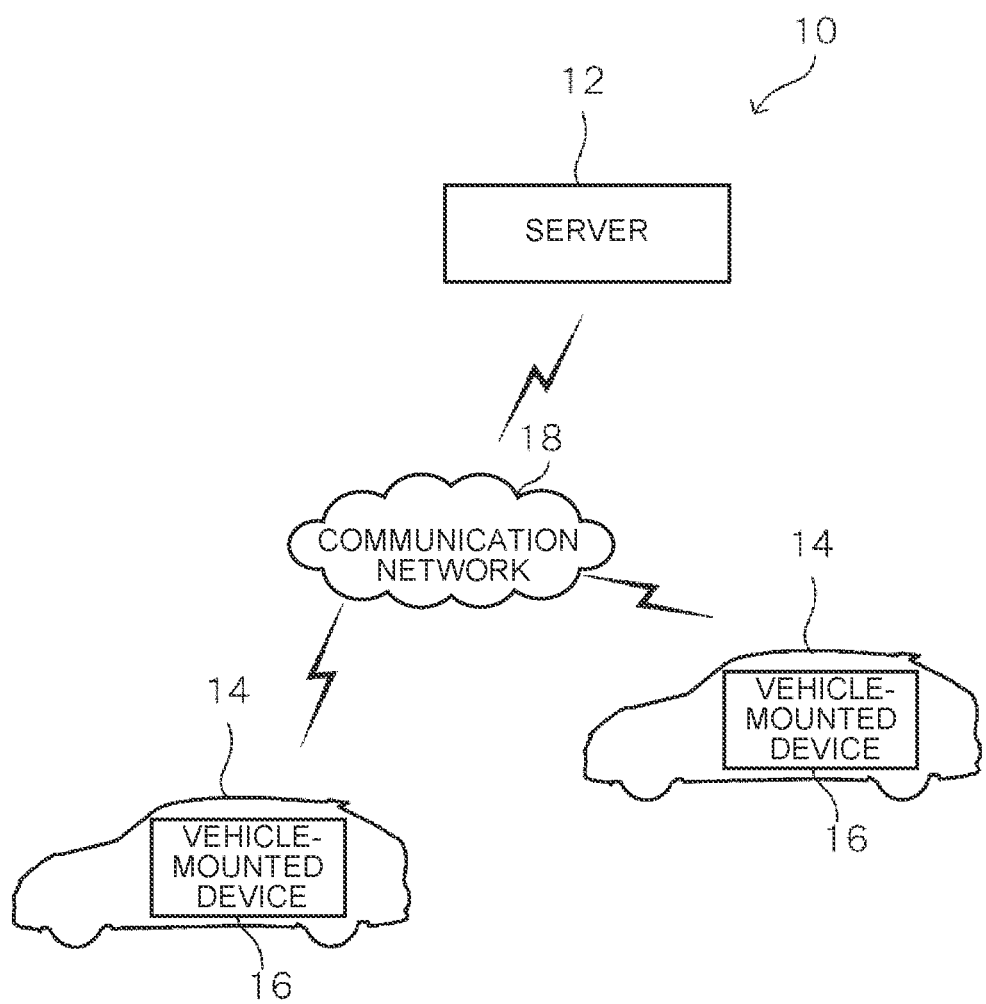
FIG. 1 is a diagram showing a schematic configuration of an information processing system according to the present embodiment.

Hereinafter, an example of an embodiment of the present disclosure will be described in detail with reference to the drawings. FIG. 1 is a diagram showing a schematic configuration of an information processing system according to the present embodiment.

In an information processing system 10 according to the present embodiment, a vehicle-mounted device 16 mounted on a vehicle 14 and a server 12 as an example of an information processing device are connected via a communication network 18. In the information processing system 10 according to the present embodiment, image information obtained by capturing images by a plurality of the vehicle-mounted devices 16 and vehicle information indicating the state of each vehicle 14 are transmitted to the server 12, and the server 12 accumulates the image information and the vehicle information. Based on the accumulated image information and vehicle information, the server 12 performs a process of extracting a captured image of a dozing scene of the driver.

Figure 2:
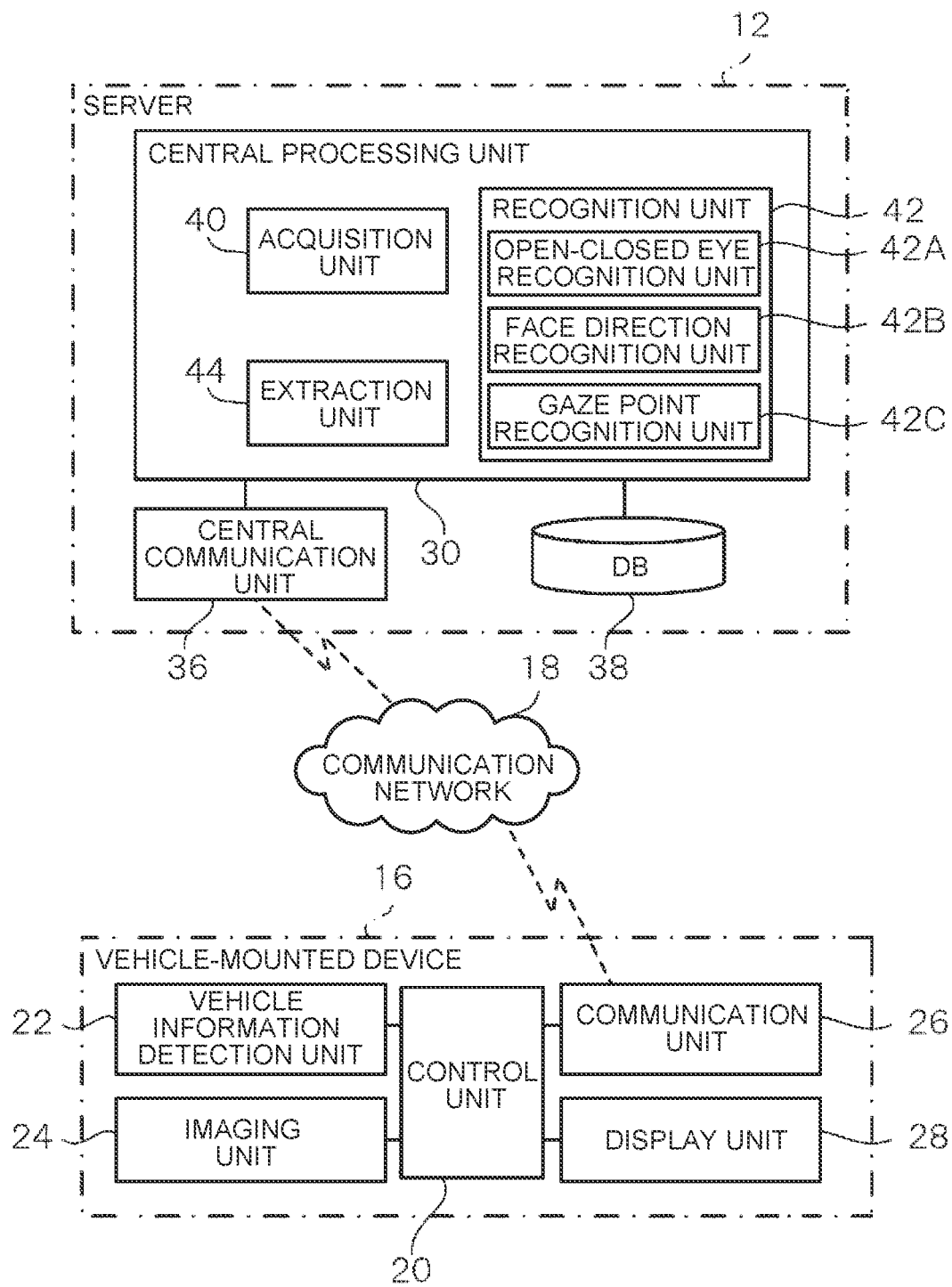
FIG. 2 is a functional block diagram showing a functional configuration of a vehicle-mounted device and a server in the information processing system according to the present embodiment.

FIG. 2 is a functional block diagram showing a functional configuration of the vehicle-mounted device 16 and the server 12 in the information processing system 10 according to the present embodiment.

The vehicle-mounted device 16 includes a control unit 20, a vehicle information detection unit 22, an imaging unit 24, a communication unit 26, and a display unit 28.

The vehicle information detection unit 22 detects the vehicle information regarding the vehicle 14. In the present embodiment, vehicle speed information indicating a vehicle speed is acquired as an example of the vehicle information, but vehicle information other than the vehicle speed may also be detected. For example, the vehicle information such as position information, acceleration, a steering angle, and an accelerator operation amount of the vehicle 14, and a distance and a route to an obstacle around the vehicle 14 is detected. More specifically, a plurality of types of sensors and devices that acquire information indicating what kind of situation the surrounding environment of the vehicle 14 is can be applied to the vehicle information detection unit 22.

Examples of the sensors and the devices include sensors mounted on the vehicle 14 such as a vehicle speed sensor, a steering angle sensor, and an acceleration sensor, a global navigation satellite system (GNSS) device, a vehicle-mounted communication device, a navigation system, and a radar device. The GNSS device receives a GNSS signal including time information from a plurality of GNSS satellites and measures the position of the own vehicle 14. The positioning accuracy of the GNSS device improves as the number of receivable GNSS signals increases. The vehicle-mounted communication device is a communication device that performs at least one of vehicle-to-vehicle communication with other vehicles 14 and road-to-vehicle communication with a roadside device via the communication unit 26. The navigation system includes a map information storage unit that stores map information, and displays the position of the own vehicle 14 on a map based on the position information obtained from the GNSS device and the map information stored in the map information storage unit, and performs a process of guiding the route to the destination. Further, the radar device includes a plurality of radars with different detection ranges, detects objects such as pedestrians and other vehicles 14 existing around the vehicle 14, and acquires the relative positions and the relative speeds of the detected objects and the vehicle 14. Further, the radar device incorporates a processing device for processing the searching results of the surrounding objects. The processing device excludes noise and a roadside object such as guardrails from a monitoring target based on changes in the relative position and the relative speed of each object included in the most recent searching results, and follows and monitors the pedestrians, the other vehicles 14, and the like as objects to be monitored. The radar device then outputs information such as the relative position and the relative speed with respect to each object to be monitored.

In the present embodiment, the imaging unit 24 is mounted in the vehicle cabin, captures an image of the driver, and generates image data representing a captured image of a moving image. The imaging unit 24 may further capture at least one of images of areas around the vehicle 14 from among an image of an area forward of the vehicle 14, an image of an area on the side of the vehicle 14, and an image of an area rearward of the vehicle 14.

The communication unit 26 establishes communication with the server 12 via the communication network 18 and transmits and receives information such as the image information obtained by capturing the images by the imaging unit 24 and the vehicle information detected by the vehicle information detection unit 22.

The display unit 28 provides various kinds of information to an occupant by displaying information. In the present embodiment, information provided from the server 12 and the like are displayed.

Figure 3:
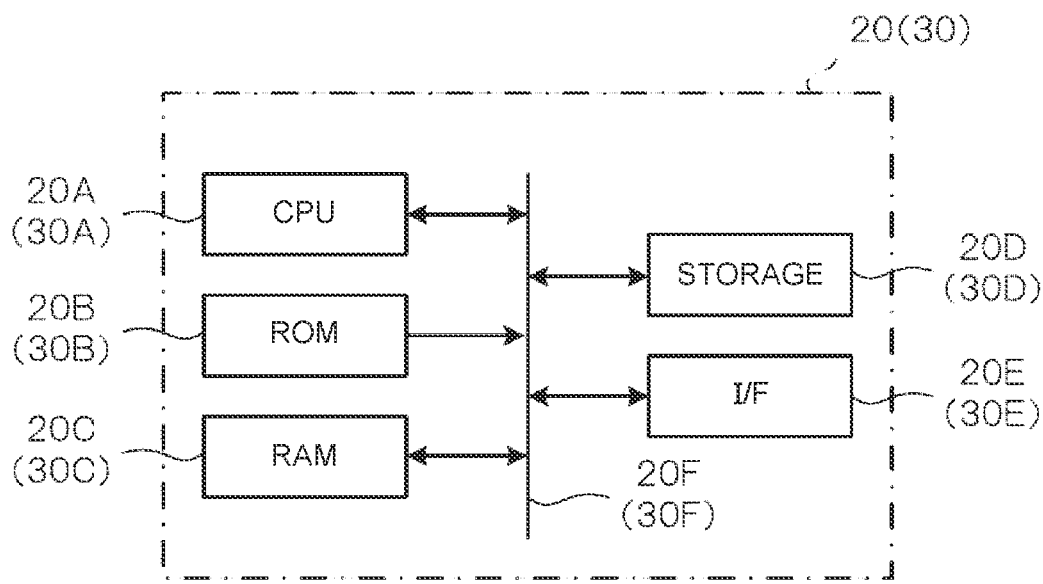
FIG. 3 is a block diagram showing a configuration of a control unit and a central processing unit.

As shown in FIG. 3, the control unit 20 is composed of a general microcomputer including a central processing unit (CPU) 20A, a read-only memory (ROM) 20B, a random access memory (RAM) 20C, a storage 20D, an interface (I/F) 20E, a bus 20F, and the like. Further, the control unit 20 performs control such as uploading, to the server 12, the image information indicating the image captured by the imaging unit 24 and the vehicle information detected by the vehicle information detection unit 22 when the image is captured.

On the other hand, the server 12 includes a central processing unit 30, a central communication unit 36, and a database (DB) 38.

The central processing unit 30, as shown in FIG. 3, is composed of a general microcomputer including a CPU 30A, a ROM 30B, a RAM 30C, a storage 30D, an interface (I/F) 30E, a bus 30F, and the like. The central processing unit 30 has functions of an acquisition unit 40, a recognition unit 42, and an extraction unit 44, as shown in FIG. 2. Each function of the central processing unit 30 is realized by executing a program stored in the ROM 30B or the like using the CPU 30A.

The acquisition unit 40 acquires the vehicle information and a moving image frame as the image information captured by the imaging unit 24 from the DB 38. Specifically, the vehicle information and the moving image frame are synchronized with each other by adjusting the time of the vehicle information and the moving image frame, so that information is acquired.

The recognition unit 42 includes an open-closed eye recognition unit 42A, a face direction recognition unit 42B, and a gaze point recognition unit 42C, and recognizes opening and closing of the eyes of the driver, the direction of the face, and the gaze point.

The open-closed eye recognition unit 42A recognizes the opening and closing of the eyes by extracting the positions of the eyes from the captured image of the driver. Further, the face direction recognition unit 42B extracts the face of the driver from the captured image of the driver and recognizes the direction of the face. Further, the gaze point recognition unit 42C recognizes the gaze point of the driver from the captured image of the driver. Each of the open-closed eye recognition unit 42A, the face direction recognition unit 42B, and the gaze point recognition unit 42C recognizes the opening and closing of the eyes, the direction of the face, and the gaze point by image recognition. For example, using a model learned in advance by machine learning or the like, the opening and closing of the eyes, the direction of the face, and the gaze point are recognized. Further, in the present embodiment, the open-closed eye recognition unit 42A outputs 2 when the eyes are closed, outputs 1 when the eyes are open, and outputs 0 when the opening and closing of the eyes is not detected. Further, in the present embodiment, the face direction recognition unit 42B and the gaze point recognition unit 42C are provided, but only one of the face direction recognition unit 42B and the gaze point recognition unit 42C may be provided.

The extraction unit 44 extracts the captured image corresponds to a dozing scene in which the driver is driving with the eyes closed from among the captured images of the moving images based on the vehicle information acquired by the acquisition unit 40 and the recognition result of the recognition unit 42.

The central communication unit 36 establishes communication with the vehicle-mounted device 16 via the communication network 18 to transmit and receive the information such as the image information and the vehicle information.

The DB 38 receives the image information and the vehicle information from the vehicle-mounted device 16, and accumulates the received image information and vehicle information in association with each other.

In the information processing system 10 configured as described above, the image information captured by the imaging unit 24 of the vehicle-mounted device 16 is transmitted to the server 12 together with the vehicle information and is accumulated in the DB 38. Then, the server 12 performs a process of extracting the captured image corresponding to the dozing scene based on the image information and the vehicle information accumulated in the DB 38.

Here, the extraction of the captured image corresponding to the dozing scene of the driver by the extraction unit 44 of the server 12 will be described in detail.

The extraction unit 44 starts extracting the dozing scene when the vehicle speed is equal to or higher than a predetermined vehicle speed (for example, 10 km) and the open-eye determination by the open-closed eye recognition unit 42A is 2 (closed eyes).

In addition, the extraction unit 44 terminates the extraction of the dozing scene when the open-eye determination by the open-closed eye recognition unit 42A is 0 (not detected) or the open-eye determination as 1 (open eyes) by the open-closed eye recognition unit 42A continues for a predetermined time (for example, 0.2 seconds) or longer (duration while the eyes are closed is less than the predetermined time), or the vehicle speed is less than the predetermined vehicle speed (for example, 10 km).

Figure 4:
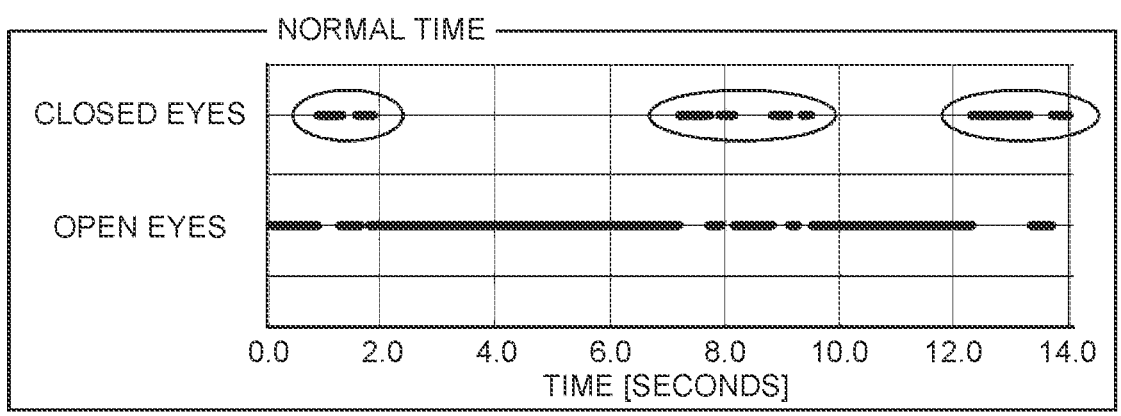
FIG. 4 is a diagram showing an example of a state of eyes of a driver in normal time and in a dozing diagnostic example.
Figure 4:
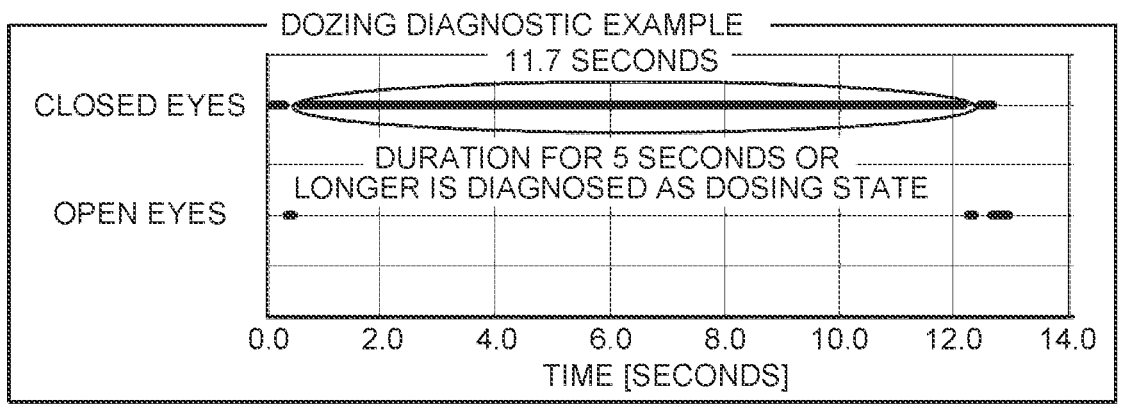

Further, the extraction unit 44 counts the duration of the open-eye determination as 2 by the open-closed eye recognition unit 42A, and determines that the driver is dozing off when the duration is equal to or longer than the predetermined time (for example, 5 seconds or the like). For example, in the case of the upper part of FIG. 4, the eyes are closed for a short period of time, so the state is not a dozing state but a state of normal time. On the other hand, as shown in the lower part of FIG. 4, when the closed-eye state continues for a predetermined time (for example, 5 seconds) or longer, the state is diagnosed as a dozing state. FIG. 4 is a diagram showing an example of a state of the eyes of the driver in the normal time and in the dozing diagnostic example. The extraction unit 44 may determine that the driver is in a weak doze when the closed-eye state continues for a predetermined time range (for example, 5 seconds or longer and less than 11 seconds), and determines that the driver is in a strong doze when the closed-eye state continues for a predetermined time or longer (for example, 11 seconds or longer).

By the way, when the imaging unit 24 is installed at a position higher than a predetermined position, it is difficult to recognize the eyes and the line of sight, and when the eyes and the face are turned downward due to the operation of the smartphone, etc., the open-eye state and the closed-eye state may be erroneously recognized. For example, in a case where the gaze point is on the lower position, the state is erroneously determined as a dozing state when the degree of eye opening is detected as in the conventional art. In addition, even when the open-closed eyes are recognized, the eyes are erroneously determined to be closed.

Figure 5:
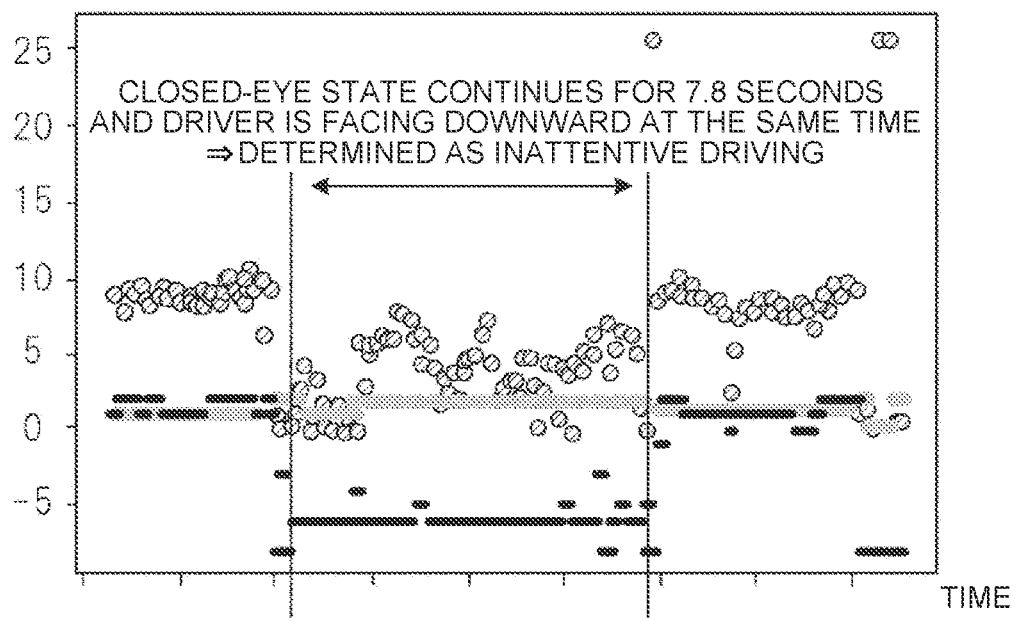
FIG. 5 is a diagram showing an example of a detection result of a degree of eye opening, a recognition result of open-closed eyes, and a recognition result of a gaze point when the driver is facing downward.

Therefore, in the present embodiment, the extraction unit 44 invalidates the closed-eye determination in which the open-closed eye recognition unit 42A recognizes the eyes as the closed-eye state when the face is facing directions other than the forward direction, and extracts the captured image in which the eyes are closed and the face is facing forward in a predetermined range. As a result, it is possible to suppress erroneous determination when the driver is facing downward. For example, as shown in FIG. 5, when the closed-eye state continues for 7.8 seconds and the driver is facing downward at the same time, it is determined that the driver drives inattentively rather than that the driver dozes off. FIG. 5 is a diagram showing an example of a detection result of the degree of eye opening, a recognition result of the open-closed eyes, and a recognition result of the gaze point when the driver is facing downward.

Figure 6:
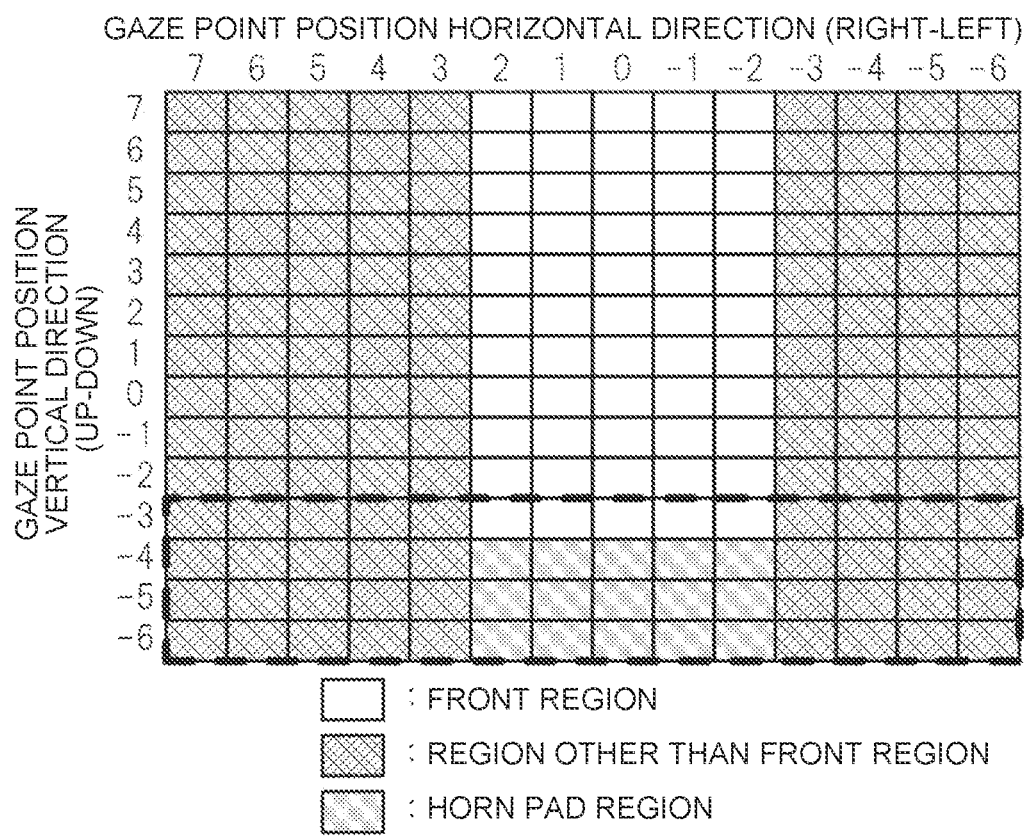
FIG. 6 is a diagram for describing a method for determining a direction of a face from the gaze point.

The direction of the face may be determined from the recognition result of the face direction recognition unit 42B, or may be determined from the gaze point recognized by the gaze point recognition unit 42C. When the direction of the face is determined from the gaze point, for example, as shown in FIG. 6, the region of the gaze point is detected by dividing the region of the gaze point into regions of positive five to negative five in each direction of a gaze point position horizontal direction (right-left direction) and a gaze point position vertical direction (up-down direction). Then, the range in which the gaze point is from positive two to negative two in the gaze point position horizontal direction and the gaze point is from positive five to negative two in the gaze point position vertical direction is determined that the driver is facing forward. In addition, in the range in which the gaze point is negative three to negative five in the gaze point position vertical direction, which is enclosed by the dotted line in FIG. 6, the driver is facing downward and the state may be erroneously determined as the closed-eye state, which results in erroneous detection as the dozing state. Therefore, when the gaze point is on and lower position that is out of the predetermined range, the state is not determined as the dozing state, and the recognition result by the open-closed eye recognition unit 42A is invalidated.

Further, the extraction unit 44 may preferentially extract the captured image in which the driver is facing forward in the right-left direction over the captured image in which the driver is facing forward in the up-down direction from among the captured images extracted as the dozing scene. For example, in the dozing diagnostic example shown in the lower part of FIG. 4, the captured image of the dozing time recognized as the closed-eye state for 11.7 seconds is extracted. In this case, in order to make it easier to check the opening and closing of the eyes, the captured image in which the face (right-left direction) is facing forward may be preferentially extracted, or the captured image in which the face (up-down direction) is facing forward may be preferentially extracted, but it is desirable that the face (right-left direction) that is less affected by the sitting height of the driver be preferentially extracted.

Next, a specific process performed by the server 12 of the information processing system 10 according to the present embodiment configured as described above will be described. FIG. 7 is a flowchart showing an example of a flow of the process performed by the server 12 in the information processing system 10 according to the present embodiment. The process of FIG. 7 is started, for example, when an instruction for starting the extraction of the dozing scene is transmitted to the server 12.

In step 100, the CPU 30A acquires the vehicle information and the captured image, and proceeds to step 102. That is, the acquisition unit 40 acquires the vehicle information and the moving image frame as the image information captured by the imaging unit 24 from the DB 38. Specifically, the vehicle information and the moving image frame are synchronized with each other by adjusting the time of the vehicle information and the moving image frame, so that information is acquired.

In step 102, the CPU 30A starts recognizing the open-closed eyes and the direction of the face, and proceeds to step 104. That is, the recognition of the opening and closing of the eyes by the open-closed eye recognition unit 42A is started, and at least one of the recognition of the direction of the face of the driver by the face direction recognition unit 42B and the recognition of the gaze point of the driver by the gaze point recognition unit 42C is started.

In step 104, the CPU 30A determines whether a predetermined doze detection start condition is satisfied. In this determination, for example, it is determined whether the vehicle speed is equal to or higher than the predetermined vehicle speed (for example, 10 km) and the open-eye determination by the open-closed eye recognition unit 42A is 2 (closed eyes). When the determination is Yes, the process proceeds to step 106, and when the determination is No, the process proceeds to step 114.

In step 106, the CPU 30A determines whether the eyes have been closed for a predetermined first threshold time (for example, 5 seconds) or longer. When the determination is Yes, the process proceeds to step 108, and when the determination is No, the process proceeds to step 114.

In step 108, the CPU 30A determines whether the driver is facing forward. This determination may be made based on the recognition result by the face direction recognition unit 42B, or it may be determined whether the gaze point recognized by the gaze point recognition unit 42C is in the front region shown in FIG. 6. When the determination is Yes, the process proceeds to step 110, and when the determination is No, the process proceeds to step 114.

In step 110, the CPU 30A extracts the captured image as the dozing scene, and proceeds to step 112.

In step 112, the CPU 30A determines whether a doze detection end condition is satisfied. In this determination, for example, it is determined whether the open-eye determination by the open-closed eye recognition unit 42A is 0 (not detected) or the open-eye determination as 1 (open eyes) by the open-closed eye recognition unit 42A continues for the predetermined time (for example, 0.2 seconds) or longer, or the vehicle speed is less than the predetermined vehicle speed (for example, 10 km). When the determination is No, the process returns to step 110 to repeat the above process, and when the determination is Yes, the process proceeds to step 114.

In step 114, the CPU 30A determines whether the extraction of the dozing scene is ended. In this determination, for example, it is determined whether the extraction of the dozing scene has been ended for the target captured image by the above process. When the determination is No, the process returns to step 104 to repeat the above process, and when the determination is Yes, the series of process ends. The extraction unit 44 may preferentially extract the captured image in which the driver is facing forward in the right-left direction over the captured image in which the driver is facing forward in the up-down direction from among the captured images extracted as the dozing scene. As a result, it is possible to suppress erroneous determination that the eyes are closed although the eyes are not closed and reliably obtain the captured image in which the eyes are closed.

The server 12 performs the process as described above, so that not only the captured image in which the eyes are closed but also the captured image in which the face is facing forward are extracted. Therefore, it is possible to reliably extract the captured image of the dozing scene in which the eyes are closed as compared with a case where the captured image of the closed eye state is extracted based on the degree of eye opening only.

In addition, as the doze detection start condition, the captured image at a vehicle speed equal to or higher than the predetermined threshold value is extracted, so that the extraction of the captured image in which the driver closes the eyes during parking such as rest can be excluded.

Further, when the open-eye determination by the open-closed eye recognition unit 42A is 0 (not detected) or the open-eye determination as 1 (open eyes) by the open-closed eye recognition unit 42A continues for the predetermined time or longer, or when the vehicle speed is less than the predetermined vehicle speed, the extraction of the dozing scene is ended, so that only the captured image in which the driver closes the eyes during traveling can be extracted.

Further, since the captured image of the gaze point outside the predetermine range is not determined as the dozing scene and the recognition result by the open-closed eye recognition unit 42A is invalidated, it is possible to suppress the erroneous determination when the captured image of the closed-eye state is extracted.

In the above-described embodiment, the example in which the server 12 performs the process of extracting the dozing scene has been described, but the present disclosure is not limited to this. For example, as shown in FIG. 8, the functions of the central processing unit 30 of FIG. 2 may be provided in the control unit 20 on the vehicle-mounted device 16 side, and the control unit 20 may execute the process of FIG. 7. That is, the control unit 20 may have the functions of the acquisition unit 40, the recognition unit 42, and the extraction unit 44. In this case, the acquisition unit 40 acquires the vehicle information from the vehicle information detection unit 22, acquires the moving image frame from the imaging unit 24, and the vehicle-mounted device 16 is an example of the information processing device. Alternatively, a configuration may be employed in which a plurality of servers is provided and the above functions are distributed to reduce the load on each server.

Further, the process performed by each unit of the information processing system 10 in each of the above embodiments may be a process performed by a software by executing a program, or a process performed by hardware such as a graphics processing unit (GPU), an application specific integrated circuit (ASIC), and a field-programmable gate array (FPGA). Alternatively, the process may be a combination of both the software and the hardware. When the process performed by the software is adopted, the program may be stored in various storage media and distributed.

Further, the present disclosure is not limited to the above-described embodiments, and it goes without saying that other than the above-described embodiments, various modifications can be made without departing from the scope of the present disclosure.

What is claimed is:

1. An information processing device, comprising:
    at least one processor configured to:
        acquire captured images from a moving image of a face of an occupant,
        recognize a direction of the face of the occupant and an open-closed state of an eye of the occupant in the captured images,
        determine whether duration when the eye is closed is equal to or more than a predetermined time,
        in response to determining that the duration when the eye is closed is equal to or more than the predetermined time, determine whether the face is facing forward in a predetermined range, in response to determining that the face is facing forward in the predetermined range, determine that the occupant is dozing off, and extract, from among the captured images, a captured image in which the eye is closed and the face is facing forward in the predetermined range, and in response to determining that the face is not facing forward in the predetermined range, determine that the occupant is not dozing off, and terminate extraction of, from among the captured images, a captured image in which the eye is closed and the face is not facing forward in the predetermined range.

2. The information processing device according to claim 1, wherein:

the at least one processor is configured to further acquire vehicle speed information, and extract the captured image when a vehicle speed is equal to or higher than a predetermined threshold value.

3. The information processing device according to claim 2, wherein the at least one processor is configured to terminate extraction of the captured image when the vehicle speed is less than the predetermined threshold value or the duration when the eye is closed is less than the predetermined time.

4. The information processing device according to claim 1, wherein:

the at least one processor is configured to further recognize a gaze point of the occupant, and invalidate a recognition result of the open-closed state with respect to a captured image of the gaze point outside the predetermined range.

5. The information processing device according to claim 1, wherein the at least one processor is configured to extract a captured image in which the occupant is facing forward in a right-left direction over a captured image in which the occupant is facing forward in an up-down direction.

6. An information processing system, comprising:

a vehicle including an imaging unit configured to capture a moving image of a face of an occupant and generate captured images from the moving image; and an information processing device including at least one processor configured to acquire the captured images from the vehicle, recognize a direction of the face of the occupant and an open-closed state of an eye of the occupant in the captured images, determine whether duration when the eye is closed is equal to or more than a predetermined time, in response to determining that the duration when the eye is closed is equal to or more than the predetermined time, determine whether the face is facing forward in a predetermined range, in response to determining that the face is facing forward in the predetermined range, determine that the occupant is dozing off, and extract, from among the captured images, a captured image in which the eye of the occupant is closed and the face is facing forward in the predetermined range, and in response to determining that the face is not facing forward in the predetermined range, determine that the occupant is not dozing off, and terminate extraction of, from among the captured images, a captured image in which the eye is closed and the face is not facing forward in the predetermined range.

7. An information processing method in which a computer executes processes, the method comprising:

acquiring captured images from a moving image of a face of an occupant;

recognizing a direction of the face of the occupant and an open-closed state of an eye of the occupant in the captured images;

determining whether duration when the eye is closed is equal to or more than a predetermined time;

in response to determining that the duration when the eye is closed is equal to or more than the predetermined time, determining whether the face is facing forward in a predetermined range;

in response to determining that the face is facing forward in the predetermined range, determining that the occupant is dozing off, and extracting, from among the captured images that have been acquired, a captured image in which the eye is closed and the face is facing forward in predetermined range; and in response to determining that the face is not facing forward in the predetermined range, determining that the occupant is not dozing off, and terminating extraction of, from among the captured images, a captured image in which the eye is closed and the face is not facing forward in the predetermined range.

8. The information processing device according to claim 1, wherein the predetermined time includes a first predetermined time, and a second predetermined time being longer than the first predetermined time; and the at least one processor is configured to in response to determining that (i) the face is facing forward in the predetermined range, and (ii) the eye is closed equal to or more than the first predetermined time and less than the second predetermined time, determine that the occupant is dozing off at a first state; and in response to determining that (i) the face is facing forward in the predetermined range, and (iii) the eye is closed equal to or more than the second predetermined time, determine that the occupant is dozing off at a second state wherein the occupant is in a doze stronger than that in the first state.

9. The information processing system according to claim 6, wherein the predetermined time includes a first predetermined time, and a second predetermined time being longer than the first predetermined time; and the at least one processor is configured to in response to determining that (i) the face is facing forward in the predetermined range, and (ii) the eye is closed equal to or more than the first predetermined time and less than the second predetermined time, determine that the occupant is dozing off at a first state; and in response to determining that (i) the face is facing forward in the predetermined range, and (iii) the eye is closed equal to or more than the second predetermined time,
   determine that the occupant is dozing off at a second state wherein the occupant is in a doze stronger than that in the first state.

10. The information processing method according to claim 7, wherein
the predetermined time includes
   a first predetermined time, and
   a second predetermined time being longer than the first predetermined time; and
the computer executes
   in response to determining that (i) the face is facing forward in the predetermined range, and (ii) the eye is closed equal to or more than the first predetermined time and less than the second predetermined time,
      determining that the occupant is dozing off at a first state; and
   in response to determining that (i) the face is facing forward in the predetermined range, and (iii) the eye is closed equal to or more than the second predetermined time,
      determining that the occupant is dozing off at a second state wherein the occupant is in a doze stronger than that in the first state.

11. The information processing device according to claim 8, wherein:
the at least one processor is configured to
   further recognize a gaze point of the occupant, and
   invalidate a recognition result of the open-closed state with respect to a captured image of the gaze point outside the predetermined range.

12. The information processing system according to claim 9, wherein:
the at least one processor is configured to
   further recognize a gaze point of the occupant, and
   invalidate a recognition result of the open-closed state with respect to a captured image of the gaze point outside the predetermined range.

13. The information processing method according to claim 10, wherein:
the computer executes
   further recognizing a gaze point of the occupant, and
   invalidating a recognition result of the open-closed state with respect to a captured image of the gaze point outside the predetermined range.

* * * * *